United States Patent [19]

Davis et al.

[11] Patent Number: 4,617,503
[45] Date of Patent: Oct. 14, 1986

[54] ACTIVE DATUM FOR COORDINATE REFERENCE IN A NUMERICALLY CONTROLLED MACHINE TOOL

[75] Inventors: Richard K. Davis, Charlottesville, Va.; Clayton R. Roberts, Syracuse; Stephen W. Tehon, Clay, both of N.Y.

[73] Assignee: General Electric Company, Syracuse, N.Y.

[21] Appl. No.: 801,823

[22] Filed: Nov. 26, 1985

[51] Int. Cl.⁴ .............................................. G05B 19/24
[52] U.S. Cl. ...................................... 318/572; 318/39; 364/474
[58] Field of Search ................. 318/39, 568, 572, 460, 318/571, 569; 364/474

[56] References Cited

U.S. PATENT DOCUMENTS

| 3,671,840 | 6/1972 | Meyer et al. | 318/39 X |
| 4,382,215 | 5/1983 | Barlow et al. | 318/568 |
| 4,428,055 | 1/1984 | Zurbrick et al. | 318/572 X |
| 4,554,495 | 11/1985 | Davis | 318/572 |
| 4,561,058 | 12/1985 | McMurty | 318/572 X |
| 4,562,392 | 12/1985 | Davis et al. | 318/39 X |

FOREIGN PATENT DOCUMENTS 0591825  2/1978  U.S.S.R. .................. 318/460
0954931  9/1982  U.S.S.R. .................. 318/460

Primary Examiner—B. Dobeck
Attorney, Agent, or Firm—Richard V. Lang; Carl W. Baker

[57] ABSTRACT

A datum is disclosed for use as a coordinate reference in a numerically controlled machine tool. The datum which is active, consists of an elongated member, typically one half wavelength in length, supported at its center (and antinode) by a plate, and including electromechanical transducers for exciting resonance in a desired fundamental longitudinal mode. The datum is operated by an operational amplifier having the transducers connected in the amplifier feedback path. Assurance against the excitation of undesired modes is achieved by limiting the gain of the operational amplifier throughout the response band of the transducers, by use of an inductor for resonating the input capacitance of the driving transducer at the frequency of the desired mode and by gain bandwidth limits of the operational amplifier. The datum is active at an ultrasonic frequency suited to touch sensing and thus produces a response in a touch sensing system when the cutter is touched to the datum. The response provides an accurate indication of the cutter position referenced to the coordinate system of the machine tool as well as a test signal for a system test calibration.

14 Claims, 16 Drawing Figures

λ/2 DATUM RESPONSE

λ DATUM RESPONSE

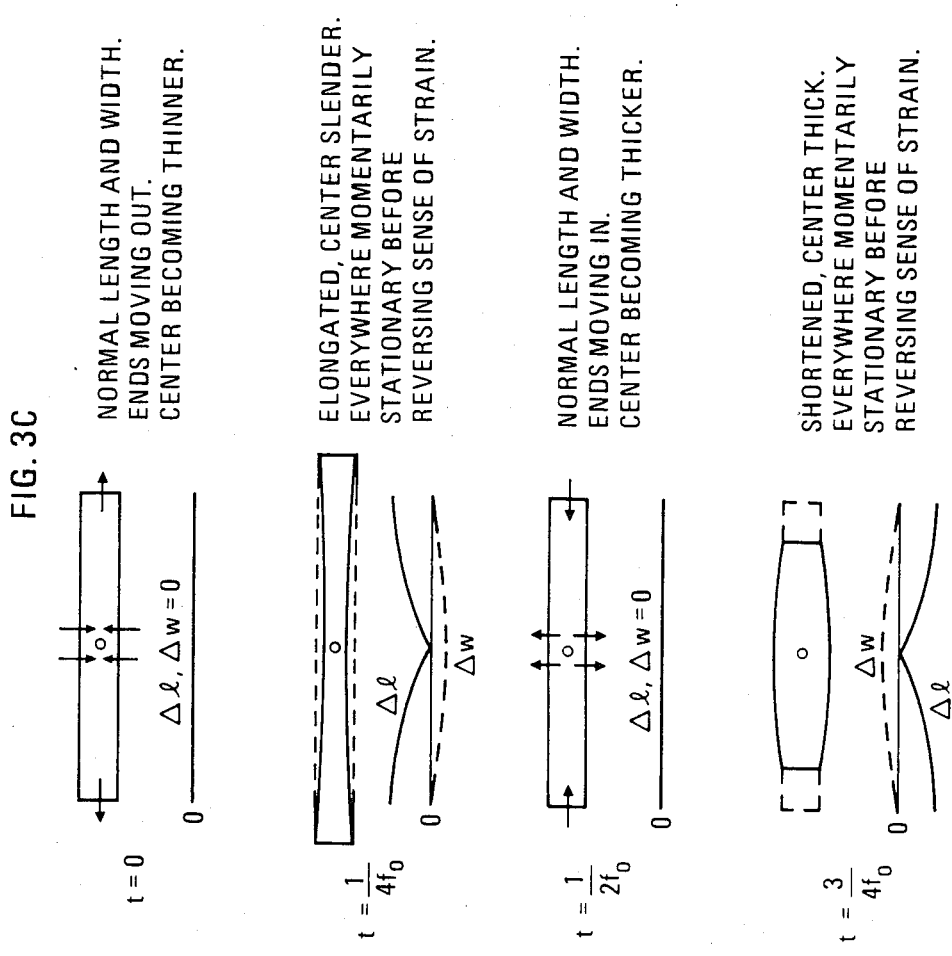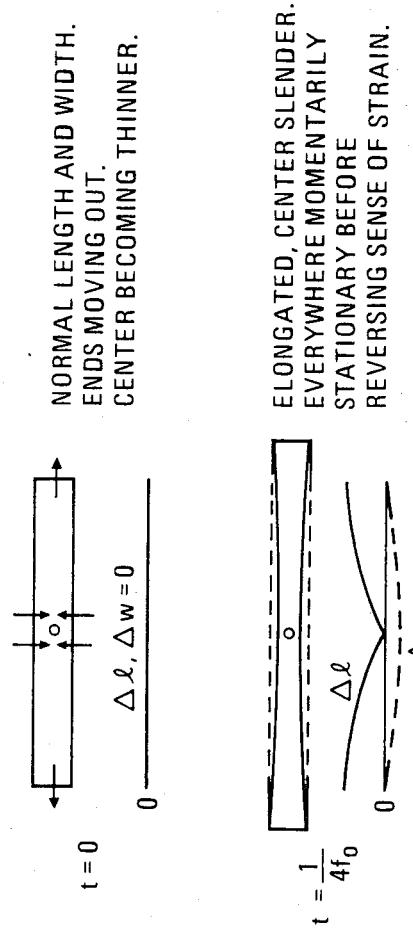

FIG. 4B

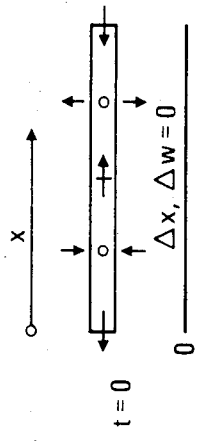
$t = 0$
$\Delta x, \Delta w = 0$
NORMAL LENGTH AND WIDTH. ENDS MOVING (TO -X). CENTER MOVING (TO +X). LEFT HALF THINNING. RIGHT HALF THICKENING.

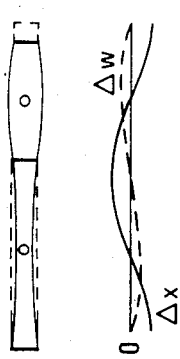
$t = \dfrac{1}{4f_2}$
LEFT HALF ELONGATED, THIN. RIGHT HALF SHORTENED, THICK. EVERYWHERE MOMENTARILY STATIONARY BEFORE REVERSING SENSE OF STRAIN.

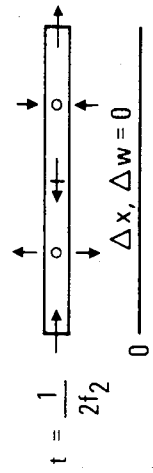
$t = \dfrac{1}{2f_2}$
$\Delta x, \Delta w = 0$
NORMAL LENGTH AND WIDTH. ENDS MOVING (TO +X). CENTER MOVING (TO -X). LEFT HALF THICKENING. RIGHT HALF THINNING.

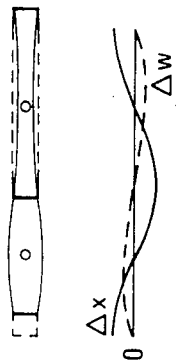
$t = \dfrac{3}{4f_2}$
LEFT HALF SHORTENED, THICK. RIGHT HALF ELONGATED, THIN. EVERYWHERE MOMENTARILY STATIONARY BEFORE REVERSING SENSE OF STRAIN.

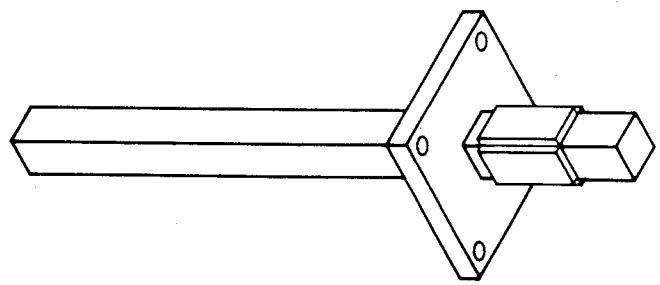
FIG. 4A

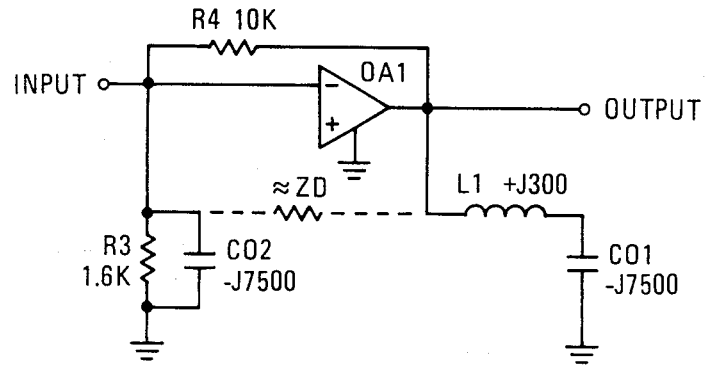
FIG. 5D LOW FREQUENCIES (10 KHz)
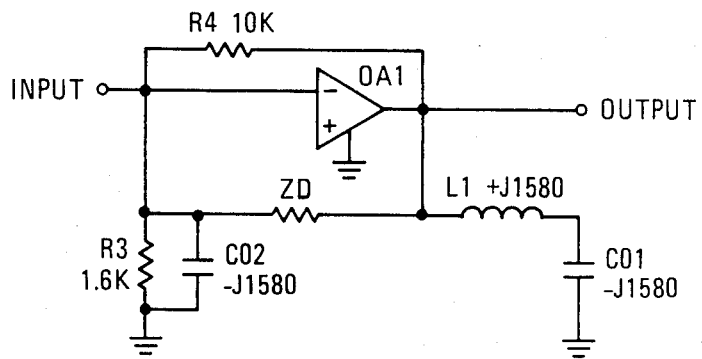
FIG. 5E VICINITY OF RESONANCE (50 KHz)
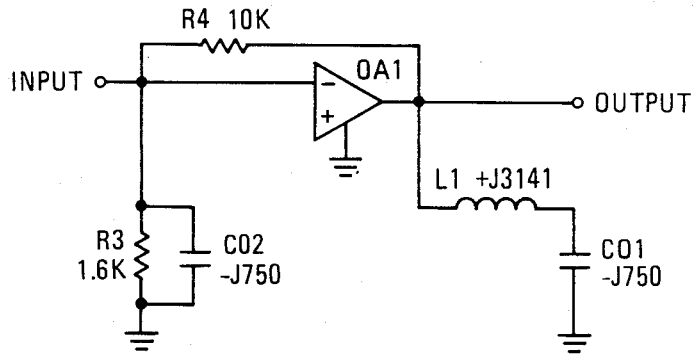
FIG. 5F HIGH FREQUENCIES (100 KHz)

ACTIVE DATUM FOR COORDINATE REFERENCE IN A NUMERICALLY CONTROLLED MACHINE TOOL

RELATED APPLICATION

The present application is related to U.S. Pat. No. 4,554,495, issued Nov. 19, 1985, on the invention of R. K. Davis entitled DATUM FOR TOOL TOUCH PROBE SYSTEM.

BACKGROUND OF THE INVENTION

The invention relates to closed loop numerically controlled machining systems and more particularly to a datum for accurately determining the position of a cutter in relation to the coordinate reference system of a machine tool.

DESCRIPTION OF THE PRIOR ART

In the development of a numerically controlled machining system, the objective has been to reduce the amount of operator supervision of the machining process. In a known machining process, using a process known as touch sensing, the cutter is advanced automatically into engagement with a rotating work piece. Upon a touching contact, a sensitive accelerometer placed in the turret signals the contact by sensing the ultrasonic vibrations produced. The signal is accompanied by an entry of the accumulated coordinate translations of the cutter. For an absolute measurement or "gauging", these coordinates must be referenced to the "home" position of the machine.

The "gauging" accuracy is reduced by the gradual erosion of the cutting surface as the machining proceeds. Thus the referencing should be frequent, and conveniently automated. The need has dictated the development of a "datum" for referencing the measurements with greater convenience than the original reference surfaces of the machine tool.

A known probe has been suggested for use as a datum in sensing absolute cutter positions in a machine tool. The known probe depends upon a change in resistivity resulting from the pressure and motion accompanying contact to sense the contact and signal that it has occurred. The accuracy of the known probe is modest, and requires adaptation to be used in a touch sensing system.

In the numerically controlled machine tool system earlier referred to, touching contact is sensed by an acclerometer, and further digital analysis of the accelerometer output is used for other purposes such as detecting tool breakage. In these applications, it has been found that ultrasonic frequencies in the vicinity of 50 kHz are ideal for monitoring the machine tool. Thus an accelerometer and a selective filter responding in this frequency range, are a part of the machine tool monitoring system. A need has been found for an improved datum which is compatible with such a numerically controlled machine tool system.

SUMMARY OF THE INVENTION

Accordingly, it is an object of the present invention to provide an improved datum for positional reference in a machine tool.

It is still another object of the present invention to provide an improved datum for positional reference suitable for use in a numerically controlled machining system.

It is another object of the present invention to provide a datum for positional reference which is compatible with a numerically controlled machining system having a touch sensing capability.

It is an additional object of the invention to provide a datum for use in a machine tool having improved accuracy.

These and other objects of the invention are achieved in an apparatus for precisely locating the cutting surface of a positionable cutter in relation to the coordinate reference system of a machine tool. The means comprise an active datum and utilize an acoustic accelerometer, typically a part of the touch sensor.

The active datum has a vibratory planar reference surface at a known position in relation to the coordinate reference system. The vibrations are at an ultrasonic frequency lying within the range suited to touch sensing, and the vibrational displacements are small in relation to the desired positional accuracy.

The active datum comprises an elongated member, the lateral surface portion(s) providing the vibratory planar reference surface. The elongated member is extensionally vibratory in a longitudinal mode with antinodes at the ends and an intermediate node. Since Poisson coupling causes a significant vibratory surface motion orthogonal to the longitudinal axis, one or both of the motions are present throughout the lateral surfaces of the elongated member.

The datum further comprises a support for attachment of the datum to the machine tool. The support attaches to the elongated member at the nodal region to favor vibration in the desired mode and to minimize energy transmission via the support to the machine tool. In addition, the support while being compliant to surface motion orthogonal to the longitudinal axis is relatively rigid to maintain accurate surface alignment and to suppress flexural vibrations. The datum further comprises an electromechanical transducer for driving the datum.

An acoustic (accelerometer) sensor, a portion of the touch sensor, is acoustically coupled to the cutter for producing an electrical output signal in response to the vibrations which occur when the cutter contacts the reference surface of an active datum. (The acoustic sensor is substantialy uncoupled acoustically from the datum in the absence of such contact.)

The datum is mechanically driven by a source of alternating electrical energy connected to the driver transducer and supplying energy at the desired resonant frequency. In a preferred form of the invention, the source of alternating electrical energy is an operational amplifier with external components establishing the gain at a moderate value, and including an inductor in the output circuit. A datum output transducer, which is mechanically coupled to the datum driving transducer, imposes the transducer response upon the amplifier feedback, forcing operation at one of the transducer's resonances. The inductive reactance, which resonates with the capacitive reactance of the driving transducer, provides a tuned circuit for forcing transducer operation at the desired mode and no other. Undesired higher frequency modes are avoided by using an operational amplifier of limited gain bandwidth. The design insures operation of the datum at the desired mode and at no other.

In accordance with a further aspect of the invention, the vibratory member of the datum is of a square cross-section and sufficiently elongated to avoid coupled modes and to reduce sensitivity of datum frequency to the accuracy of the cross-sectional dimension.

Flexural mode operation is suppressed by a balanced transducer drive and a balanced transducer load.

In one example, the datum is one half wavelength in length with the support at the mid-point of the longitudinal axis. In another example, the datum is one full wavelength in length with the support at one quarter wavelength along the longitudinal axis from one end.

BRIEF DESCRIPTION OF THE DRAWINGS

The invention and distinctive features of the invention are set forth in the claims of the present application. The invention itself, however, together with further objects and advantages thereof, may best be understood by reference to the following description and accompanying drawings in which:

FIGS. 3A, 3B, 3C, and 3D relate to a first embodiment in which the datum is resonant in a longitudinal mode, having a length of one half wavelength; FIG. 3A being a perspective mechanical drawing of the datum, FIG. 3B being an illustration of the electrical connection to the datum, FIG. 3C being a description of the vibratory state at four phases, and FIG. 3D being an illustration of the frequency response of the active datum up to 100 kHz;

FIGS. 4A, 4B, and 4C relate to a second embodiment in which the datum is one wavelength in length; FIG. 4A being a perspective view of the datum, FIG. 4B being a description of a vibratory state, and FIG. 4C being an illustration of the frequency response; and FIGS. 5A through 5F are circuit representations of the datum, the energy source for the datum, and simplified equivalent circuit representations of the combination.

DESCRIPTION OF THE PREFERRED EMBODIMENT

Figure 1A:
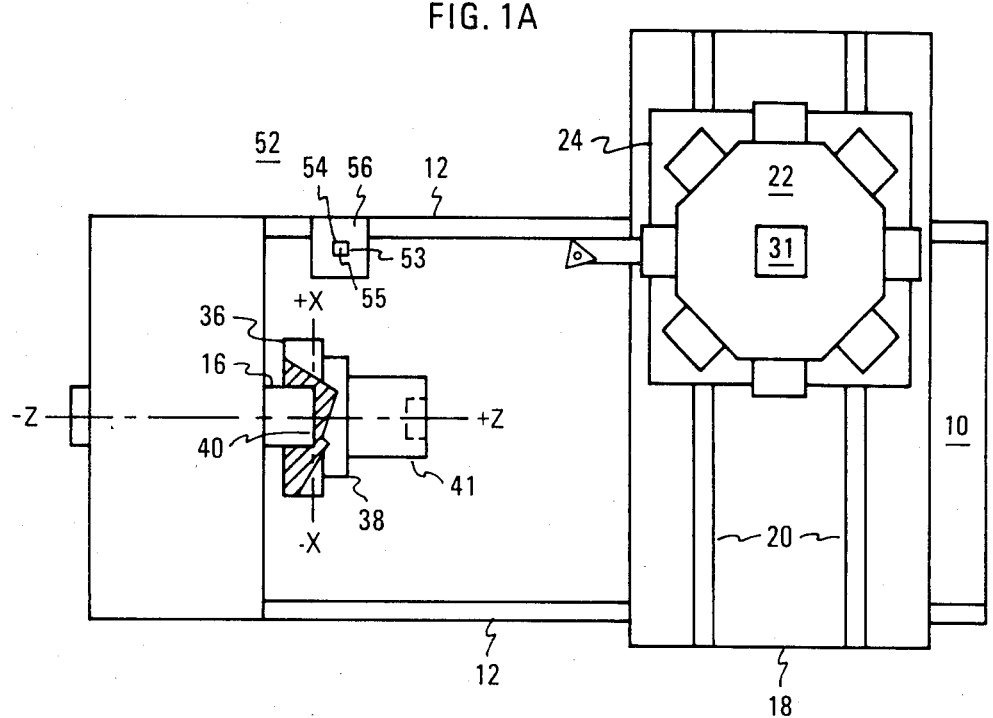
FIGS. 1A and 1B are respectively plan and perspective views of a machine tool subject to numerical control employing a novel coordinate reference datum embodying the invention.
Figure 1B:
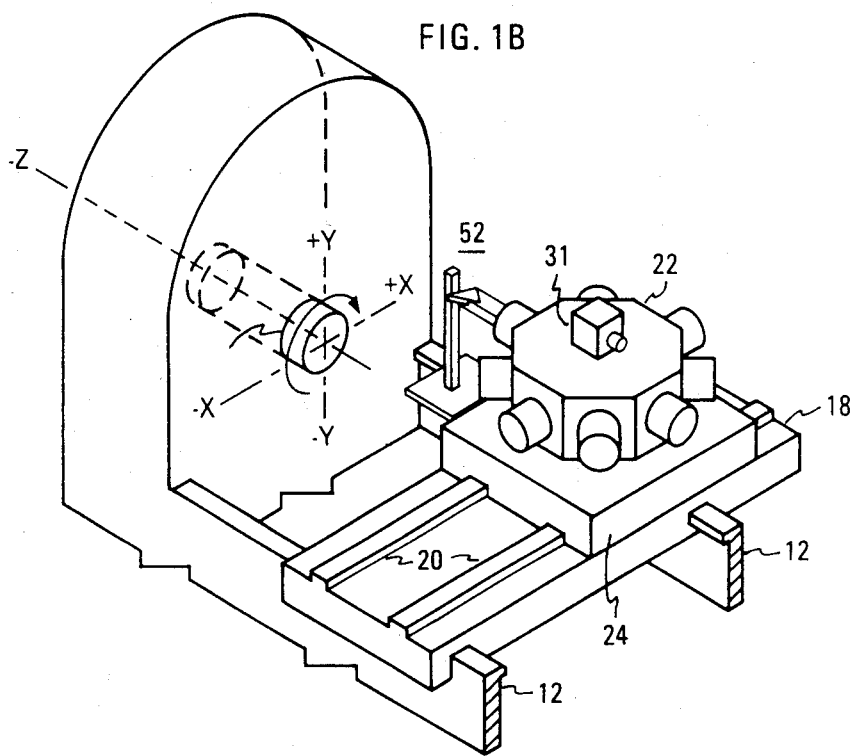

Referring now to FIGS. 1A and 1B, simplified views of a machine tool in the form of a horizontal turret lathe are shown with the novel, active datum 52 installed therein. Conventionally the selected cutter of a turret lathe is translated along two mutually perpendicular coordinate axes established by "ways". These axes in the case of a horizontal turret lathe lie in a horizontal plane and are termed the "Z" and "X" coordinates.

The Z axis with respect to which measurements are made coincides with the axis of rotation of the rotating spindle 16 of the machine tool. The spindle axis is precisely parallel to the bed 10 of the machine tool and in particular to the coplanar ways 12 mounted upon the bed. A lateral slide 18, which supports the turret 22 and in turn supports the multiple cutters installed in the turret is disposed for translation along the ways 12 of the bed. Translation of the turret along the ways 12 produces a plus or minus Z coordinate displacement of the cutting surface of the tool in relation to the spindle 16. Since the work piece 41 is rotating about the Z axis having the end remote from the cutter positioned at a fixed Z coordinate, a change in the Z coordinate of a cutter engaging the surface of the work piece, will produce a corresponding change in the Z dimension of the work piece.

The X axis designates the coordinate transverse to the Z axis of the lathe measured in a plane parallel to the plane defined by the ways 12 of the bed 10. A cross slide 24 is provided supported in lateral ways 20 formed in the lateral slide 18 for translating the turret 22 and the cutters supported thereon along the X coordinate. The ways 20 are coplanar, and lie in a plane parallel to the plane of the ways 12. In parallel planes, the ways 20 are normally oriented precisely perpendicular to the ways 12 of the lathe bed 10. Translation of the turret along the ways 20 produces a plus or minus X coordinate displacement of the cutting surface of the tool in relation to the spindle 16. When the work piece 41 is rotating about the Z axis, a change in the X coordinate of the cutter engaging the surface of the work piece, will produce a corresponding change in the radius of the work piece measured from the Z or spindle axis.

The Y axis, for horizontal lathe operation, designates the coordinate orthogonal to the horizontal X-Z plane, or vertically. In the Y coordinate, there is relatively less freedom of tool movement since the lathe is normally designed to work with cutters "on center" or slightly offset from the center of the spindle 16. In a typical horizontal lathe there is a fixed relationship in the Y coordinate between the turret, which supports the cutter, and the Z or spindle axis. In this machine, offsets of individual cutters are achieved by adjustment of the cutters within the holders at the various stations of the turret.

Finally, in a horizontal turret lathe, the machine tool is conventionally set up with the ways 20 in a horizontal plane as the name implies, the set up being established with the aid of precision levels. The X coordinate is accordingly treated as a horizontal measurement and the Y coordinate as a vertical measurement.

The home positions of the machine, i.e. the zero coordinate along the X, Y, and Z coordinate reference axes, are defined by the spindle 16. The face of the spindle defines the zero Z coordinate and the axis of the spindle defines the zero horizontal X and vertical Y coordinates. In practice the Z axis of the spindle is defined by reference to the surrounding collar, when a collar is present, or by the threads on the spindle which support the chuck.

The novel active datum 52, is used to define the cutter position in relation to the X and Z coordinates of the coordinate reference system of the machine tool which has just been described. The active datum is installed in a fixed relationship with respect to both the spindle reference surfaces and to the ways 12, and 20 of the lathe.

The active datum, which is illustrated in plan view in FIG. 1, contains two planar reference surfaces, one 53 and the other 54. It is not designed for Y coordinate reference. The planar reference surface 53, used for Z coordinate reference, lies in a vertical plane, perpendicular to the plane defined by the ways, and perpendicular to the Z axis of the spindle. More particularly, the plane in which the reference surface 53 lies is parallel to the reference surface 40 at the end of the spindle. It may be coplanar therewith or displaced along the Z dimension by a known amount. As may be appreciated, referencing the cutter surface to the datum surface 53 allows one to calibrate the position of the cutting surface in relation to home position (or the zero coordinate) along the Z axis of the coordinate reference system of the machine tool.

The active datum 52 is provided with a second planar reference surface 54 which may be used for X coordinate reference. The reference surface 54 also lies in a vertical plane, perpendicular to the planes defined by the ways 12, 20 and parallel to a vertical plane coincident with the Z axis of the machine tool and perpendicular to the ways. The reference surface 54 is normally displaced along the X coordinate from the zero coordinate position to avoid interference with the chuck or cutters. This displacement is in the plus X direction in the FIGS. 1A and 1B illustrations and is a known amount. As will be seen, referencing the cutter surface to the active datum surface 54 allows one to calibrate a cutting surface in relation to home position (or the zero coordinate) along the X axis of the coordinate reference system of the machine tool.

Assuming that the lathe is designed for rotation with the upper surface of the work piece 41 rotating downward into engagement with the cutting surface of the cutter 29, the surface 54 of the datum is the upper surface in the plan view. When the datum is being used to reference the cutter surface, the slides are actuated to translate the turret in a plus X direction and a minus Z direction from the illustration position until the cutter's cutting surface impinges the surfaces 53 or 54 of the datum.

Translation of the cutting surface on the slides is measured by a digital counting process which must take into account both the fixed displacements of the datum surfaces from the home positions in the X and Z coordinates of the coordinate reference system of the machine tool and subsequent translations of the slides such as those required to return the cutting surface into cutting position.

The alignment of the active datum in respect to the coordinate reference system of the machine tool and its use as a reference is the subject of U.S. Pat. No. 4,554,495, R. K. Davis entitled "DATUM REFERENCE FOR TOOL TOUCH PROBE SYSTEM", assigned to the assignee of the present application.

Figure 2:
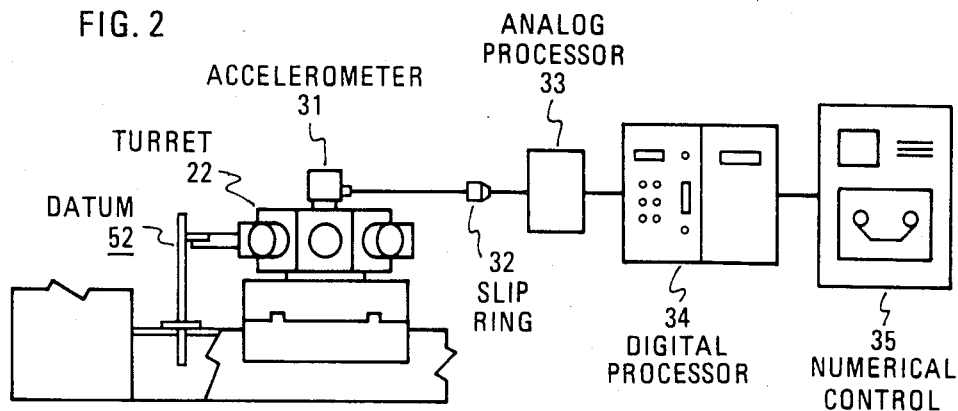
FIG. 2 is an illustration of a numerically controlled machining system illustrating the datum, the machine tool, and the major units used for numerical control of the machine.

The active datum is adapted to operate in a numerically controlled machine tool system such as that illustrated in FIG. 2. This system of automation is designed to perform a series of machining operations on a plurality of work pieces with a minimum of operator supervisor. The automatic gauging of a work piece as it is being formed in a cutter with "absolute" measurements, correcting for the gradual wearing away of the cutter and a variety of other factors, is a significant objective of the automation process.

Absolute gauging is the task of the active datum in the numerically controlled machining system shown in FIG. 2. While the numerical control system performs other tasks such as detecting tool breakage, it utilizes the active datum herein described in cooperation with the "touch sensing" elements (i.e. 31, 32 etc) of the numerical control system to obtain absolute gauging measurements.

The process involves calibration by cutting surface contact with the datum, followed by touching contact with the work piece. The touch measurement of the work piece is achieved in the FIG. 2 system by bringing the cutting surface of the cutter into contact with the work piece as it is being rotated in the chuck of the machine tool. This produces an acoustic vibration of the cutter which is transmitted to the turret supporting the cutter. An accelerometer 31 is provided supported on the turret in a position which is acoustically coupled to the cutter, for sensing these vibrations. The vibrations, which have been found to occur in the 5 to 70 Khz region, are then subjected to a series of electrical processing steps to indicate that touch has occurred. The processing, in the interests of producing unambiguous responses, has been found to provide the most interference-free operation in the vicinity of 50 Khz. In the FIG. 2 system, the selected accelerometer, while being responsive to waves over the 5 to 70 Khz region, exhibits an approximately 20 db increase in sensitivity in the 50 Khz region.

The signal derived from the accelerometer 31 is coupled by a slip-ring 32 to an analog processor 33 which has a frequency selective characteristic of approximately 50 db over a bandwidth of plus or minus 5 Khz. The signal is then detected and only a half Khz bandwidth employed for further digital processing. A digital processor 34 and the numerical control console 35 are illustrated. These elements are of value for not only sensing touch, but for sensing tool breakage and other conditions as earlier noted.

The active datum is used to provide a positional measurement of the cutting surface of the cutter in relation to the machine tool coordinate reference system of FIG. 2. When the cutter is translated into contact with the datum, assuming the datum to be stationary, there is, of course, little indication of contact other than a slight "pip" at the instant contact occurs. Accordingly, for improved detectability and accuracy, the datum has "active" reference surfaces designed for constant vibratory motion. The frequency of vibratory motion is set within the bandwidth of the touch sensing system. Accordingly, when the "active" datum is contacted by the cutter, a signal at the frequency of oscillation is coupled to the accelerometer 31 and processed by the other elements of the FIG. 2 system. This signal fixes the instant that the cutting surface is at a known reference position in the (X or Y) coordinate of the machine tool position coordinate reference system, and withdrawal of the cutting surface by measured X and Z coordinate translations gives the instantaneous tool position relative to the reference system. When "touch" of the work piece occurs and is signalled, the work piece dimension is also known in relation to the reference signal.

The frequency requirement of the active datum is specified by the numerical control system. Since the functioning of the elements 31 to 35 are such as to reduce the usable bandwidth of the touch signal, the frequency requirement of the active datum is only that its output fall within the pass band of the processing system at the point where the datum signal is extracted. Assuming that the center frequency of the analog processor is 52.8 Khz, then the normal resonant frequency of the datum should have the same value. A convenient point for deriving the datum output is after analog but prior to digital processing. This permits a drift of ±5% without loss in sensitivity. In practice, the datum may drift in frequency due to temperature or aging. Such a drift is negligibly small in terms of the system tolerance.

The datum may be seen to provide a second major function in the numerical control system just described. When the datum is so combined it will not only provide the means for obtaining absolute measurements of the work piece, but it will also provide an ultrasonic frequency suitable for testing the operation of elements in the numerical control system concerned with the initial processing of the ultrasonic waves.

Figure 3D:
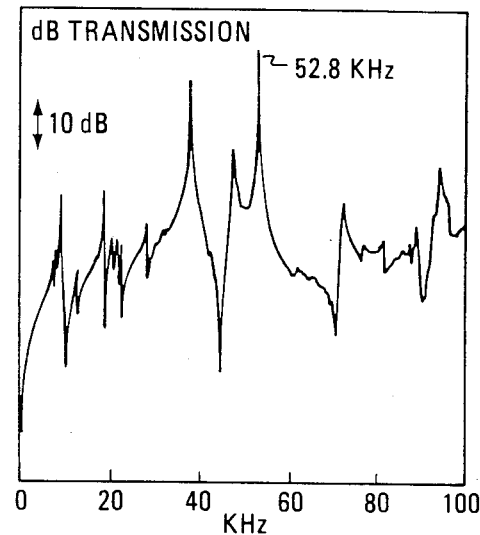
Figure 5A:
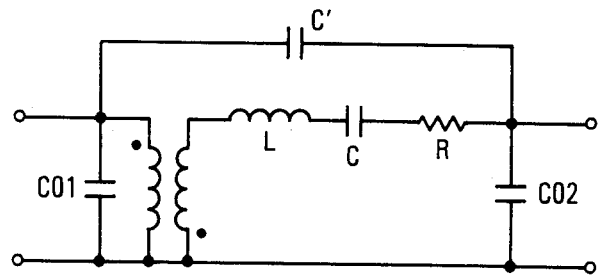
Figure 5B:
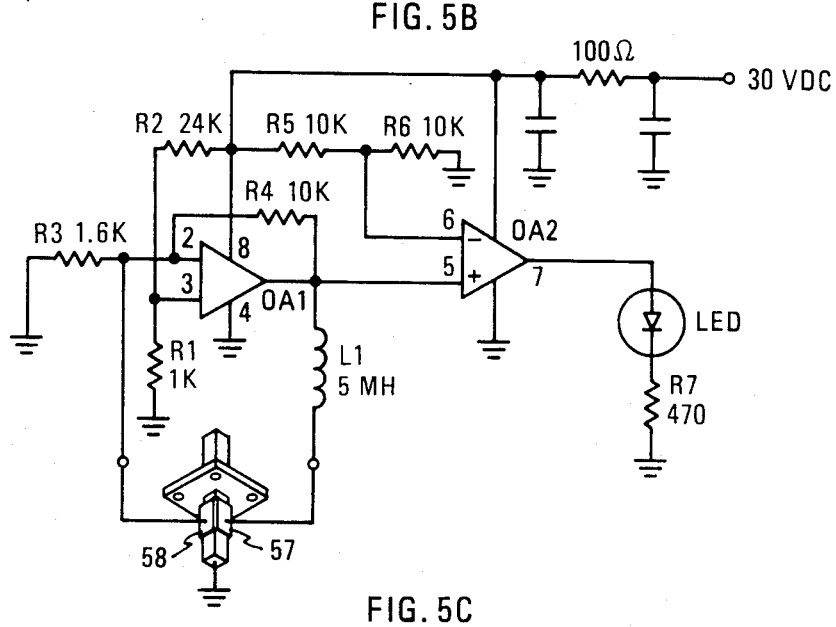

A first embodiment of the active datum, which performs the functions just described, is illustrated in FIGS. 3A and 3B. FIG. 3C illustrates the desired mode of vibration taken at ninety degree intervals, while FIG. 3D illustrates the frequency response of the datum. FIG. 5A illustrates the equivalent electrical circuit diagram of the datum, while FIG. 5B illustrates the source of alternating electric waves for sustaining oscillation of the datum in the desired resonant mode.

As best illustrated in FIG. 3A, the active datum 52 may be seen to comprise an elongated member 55 of square cross section. In the practical embodiment, the member is two inches in length and has cross sectional dimensions of one quarter of an inch. When the member is fabricated of steel with the dimensions just described, it will resonate at 52.8 kHz in a fundamental extensional mode along the major axis. In this mode, an antinode exists at each end and a node exists at the center. Under these conditions the elongated member 55 is said to be one half wavelength in length corresponding to the wavelength of the acoustic waves propagating in the steel material.

Elongation of the datum in the ratio of length to cross section of at least 5 to 1 is desirable. At this value, the cross sectional wavelength becomes less than 1/10 wavelength. This makes these modes of very high frequency and reduces the tendency of the longitudinal mode to couple efficiently to the undesired transverse mode. Use of a ratio in excess of this value has the effect of reducing the dependence of the resonant frequency upon the exact dimensions of the cross section, and makes it dependent primarily on the longitudinal dimension.

The elongated member 55 is supported at a known position in relation to the machine tool coordinate reference system by a square plate-like member 56. The support is preferably formed integrally with the elongated member and is disposed in a plane orthogonal to the axis of the elongated member, being joined at a mid point along the axis. The support 56 is one inch by one inch by one/eighth inch, and contains near its perimeter and at the corners four holes for mounting the datum at a desired position in relation to said coordinate reference system. This support can be made larger, if necessary, if secured properly.

The desired position for the elongated member 55 in relation to the coordinate reference system entails aligning the reference axes surfaces parallel to the coordinate references axes and the reference planes which they define (as earlier described). More particularly, the surface 53 of the work piece, which is employed as a reference for the Z coordinate, should be perpendicular to the Z axis and at a known displacement measured in the Z coordinate from the reference plane 40. Similarly the reference surface 54 (not shown in FIG. 3A) should be parallel to the Y-Z plane of the coordinate reference system and at a known displacement measured in the X coordinate from the Z axis.

To achieve these objectives, it is essential that the datum be accurately formed. In particular, the elongated member 55 must have planar reference surfaces and these surfaces must be at right angles to one another as required for alignment with the reference coordinate system. In the process of forming the datum all four surfaces are conventionally made adequately flat and adequately mutually perpendicular for accuracy, and the cross section of the datum is made sufficiently square to avoid undesired moding. The proper relationship of the surfaces of the elongated member 55 to the reference coordinate system is then achieved by the rectangular support 56. The support 56 establishes a mounting surface in a plane perpendicular to the axis of the elongated member, and requiring accurate positioning upon the bed of the lathe.

The active datum further includes electromechanical transducers which are applied to the elongated member for exciting vibrations in the desired mode as shown in FIGS. 3A and 3B. The transducers are two pairs of piezoelectric transducers 57, 59 and 58, 60. These transducers are applied to the four lateral surfaces of the elongated member slightly below the support 56. In the FIG. 3A illustration only the member 57 of the transducer pair 57, 59 is visible and only the member 58 of the transducer pair 58, 60 is visible. Each transducer is of a suitable piezoelectric material electroded on the top and on the bottom surfaces, and polarized in the thickness dimension. The transducer is preferably attached to the elongated member by soldering the underlying electrode thereto to ensure a high Q, high conductivity attachment. Electrical connections are illustrated in FIG. 3B are made to the overlying electrodes.

The transducers excite vibrations when an alternating electrical field is applied. When an electrical field of a suitable polarity is applied, the piezoelectric material through $d_{31}$ coupling will contract along both coordinates in a plane parallel to the surface of the elongated member. Upon a reversal of the electric field the piezoelectric material will expand along both coordinates in the same plane. The result is that the affected surface of the elongated member will experience stresses of alternating direction and strains will be set up throughout the member. While the stresses may tend to excite transverse strains (in relation to the longitudinal axis of the elongated member), they will also tend to excite longitudinal strains. Accordingly, the frequency of the electrical excitation, the location and phasing of the transducers, and the mechanical responsiveness of the datum will determine just what vibration pattern results.

The mechanical responsiveness of the datum is determined by both the configuration of the elongated member 55, the configuration of the supporting plate 56, the manner of attaching the transducers, and the frequency selected for excitation.

This relationship may be further explained by a simplified hypothetical case. Had the member 55 been a free-floating elongated member without a support, one would expect a fairly simple mechanical response, in which the most prominent mode would have been either a fundamental longitudinal mode or a fundamental flexural mode, and a restricted number of transverse modes depending upon the drive and upon the driving frequency. In the event of a symmetrical drive, in which the transducers are employed in pairs in the manner herein illustrated, the drive would have tended to provide minimal flexural and maximum longitudinal motion, and the frequency selection eliminates transverse modes. In the event that the frequency with which the conjectural free-floating arrangement was excited is that which excites the longitudinal mode, one would expect that mode to predominate even in the event that some asymmetry exists between the transducer pairs. Predominance of the longitudinal mode would occur because of the difference in frequency between the flexural (which is lower) and the longitudinal (which is higher) mode which would favor the longitudinal mode when the driving frequency corresponds to longitudinal resonance. These transverse modes which are higher in frequency would be excited if the excitation were made sufficiently high in frequency.

The mechanical response of the free-floating case of an elongated member has been discussed for purposes of illustration. The practical case of a nodally supported elongated member is illustrated in FIG. 3A. It may be seen to be complicated by the inclusion of both desired and undesired responses, which identifies desired and undesired modes.

The desired longitudinal mode of vibration is illustrated in FIG. 3C. For use as a datum, it is desirable that it provide a vibration pattern which is distributed substantially over the reference surface, and that the displacements of the reference surface be sensible to the accelerometer 31 and yet too small to affect the desired positional accuracy.

The description of the fundamental mode is provided in FIG. 3C. In the "rest" state or at a time equal to an integral number of wavelengths from the rest state, the bar is unstrained and in its original configuration. In the zero phase state, the thickness strain (delta w) is zero throughout the length of the member and the longitudinal strain (delta 1) is zero throughout the length of the member. However, contrary to the rest state, once the member is vibratory, significant stored energy (e.g. kinetic) will occur at zero degrees in the cycle. The kinetic energy is represented by the arrows implying motion at the center and ends of the member. These arrows imply that elongation is taking place at the ends of the member and that contraction is taking place at the center of the member. The situation a quarter cycle later is illustrated in the set of illustrations depicting the second state.

In the second state the bar is maximally extended (strained) longitudinally and maximally compressed (strained) transversely. The reason that elongation along the axis is accompanied by thining transverse to the axis (and the converse) is explained as the mechanical coupling which exists within solids. This coupling is called Poisson coupling and the coefficient is in the vicinity of 0.3 for many solids. The longitudinal strains (delta L1) are illustrated in the lower drawing of the FIG. 2 set. The actual lengthening increases non-linearily, increasing more rapidly at the node and less rapidly at the antinodes. The transverse strain is greatest at the center and diminishes (non-linearly) to zero at both ends.

This pattern of strains in the datum has implications for the accelerometer design, but no unique requirements are imposed on the accelerometer which do not already exist in performing the functions of the machine tool monitoring process. As noted, the motion at the center of the elongated member 55 is primarily transverse and at the ends of the elongated member primarily is longitudinal. In positions intermediate to the center and ends the motion is a combination of the two. Assuming that the tool is in contact with the active datum at some accessible position above the node (where it is supported), the cutting surface will be exposed to either one or two vibrational components; one directed toward the cutter and one directed transverse to the cutter. In the machine tool monitoring process, the accelerometer must respond to transverse motion as the work piece is being rotated in a rubbing contact of the same nature as occurs toward the nodes of the reference surface of the active datum. Similarly, in the monitoring process, the accelerometer must respond to a component directed toward the cutter corresponding to motion at the center of the reference surface of the datum. This element of motion occurs in monitoring, when chatter occurs or tool breakage results, as well as when contact occurs with irregular surfaces. In the intervening support structure, the motion may be substantially reoriented. In any event, an accelerometer selected to meet the system requirements of a machine tool monitor, will usually be responsive to these components of motion generated by the active datum.

Continuing now with a discussion of the vibratory state of the datum; the third and fourth states of the fundamental longitudinal mode are illustrated in FIG. 3C. At 180 degrees phase in the cycle, the member is of "rest" length and width and the arrows depicting motion are reversed from those illustrated in the initial state (at zero degrees in the cycle).

In the fourth state, corresponding to 270 degrees phase in the cycle, the strains depicted in the second state are reversed. At the instant pictured, the surfaces are momentarily stationary with the member 55 maximally shortened axially and maximally thickened transverse to the axis. The transverse strain is maximum at the center and zero at the ends while the longitudinal strain is zero at the center and maximum at the ends. The signs of the strains in the 270 degree phase, fourth state are thus opposite to the strains depicted in the 90 degree phase, second state.

The mode description suggests that the supporting structure (i.e. 56) which encircles the member 55 at its center may affect the response.

The support should not suppress the desired longitudinal mode of vibration. A plate passing through the center of the member 55 of finite thickness and oriented perpendicular to the axis of the member will not affect the longitudinal mode to a first order. The illustration depicts the lack of longitudinal strains at the center of the member in all four states. Thus a nodal support is particularly desirable because it is not exposed to longitudinal strains. In addition, in view of the symmetry of the oscillating mass about the center of the bar, there will be no longitudinal reaction (ideally) coupled to a centrally positioned support.

A less favorable situation exists for the nodal support when motion transverse to the axis, but accompanying the longitudinal mode is considered. As noted earlier, the center of the bar expands and contracts very significantly in a direction transverse to the axis. Accordingly, if the device is nodally supported by an encircling plate (i.e. 56), the transverse compliance of the bar will be substantially restricted at the center by the encircling plate 56 and some weakening of the response to the desired fundamental mode and some rearrangement of the response to the undesired modes may be expected. This consideration suggests making the plate thinner. However a third consideration must be taken into account. One may expect that the plate should be of sufficient rigidity to prevent casual deflection of the axis of the datum. It should also provide substantial suppression of the flexural mode. Thus the plate, while of one inch in length and width is made one eighth of an inch in thickness, a practical compromise.

The response of the datum to electrical excitation is illustrated in FIG. 3D. The graph is of electrical transmission over a band of frequencies from just above zero to 100 kHz. The graph is obtained by applying an alternating electrical potential to one pair of transducers and measuring the alternating electrical output produced at the other pair of transducers. The curve exhibits approximately nine peaks of which the strongest is at 52.8 kHz. Other strong peaks appear at approximately 36 kHz and at approximately 47 kHz. Other peaks are scattered over the spectrum from about 8 kHz to about 93 kHz. FIG. 3D suggests that if the datum is driven by an operational amplifier, which is a very convenient source of RF energy, and that if the datum is introduced into the regenerative feedback path, that while resonance at 52.8 may be favored as the strongest resonance peak in the graph, operation in any of the modes may be possible. In particular, minor transients may cause the mode to shift to one of the secondary peaks, a possibility which would introduce an undesired element of uncertainty into the operation of the active datum.

FIG. 5A illustrates an electrical equivalent circuit of the electrical and mechanical properties of the datum. These properties must be taken into account in the design of the source of alternating electrical waves used to drive the datum if single mode operation is sought. The diagram of FIG. 5A may be seen to consist of an input circuit comprising an input capacitor C01 appearing across the transducer input terminals, one input terminal of which is grounded. The input capacitor is shunted by the primary winding of an ideal one-to-one transformer having the undotted terminal grounded. The secondary winding of the ideal transformer is connected in an inverted sense to the transducer output terminal with the dotted terminal grounded. From the undotted output terminal of the secondary of the ideal transformer, a series RLC circuit is provided connected to the ungrounded output terminal. An output capacity C02 is connected in shunt between the ungrounded output terminal and ground. A capacitor C' appears between the ungrounded input and output terminals to represent stray electrical capacity.

This equivalent circuit may be used to explain the output response of the resonator at any particular frequency. The elements R, L, and C represent the mechanical properties of the resonator. Since the R corresponding to loss is small, and since the inductive reactance corresponding to mass and capacitive reactance corresponding to resilience are relatively large, resonance at the desired longitudinal mode produces a Q of approximately one thousand (ranging from 150 to 2000 depending on transducer attachment). The higher Q is substantially in excess of that which can be obtained from conventional inductors and capacitors, and since the mechanical properties are very stable, one may expect a high degree of frequency stability. The principal environmental factor affecting the mechanical properties is the temperature. Since the temperature coefficient is small, normal variations in temperature produce negligible changes in frequency (less than one part in a thousand).

The major design issue, therefore, taking into account the multiple responses present in FIG. 3D, does not arise from the small amounts of drift, which are too small to affect mode selection but rather, the tendency, if a wide band gain is present to sustain one of the undesired modes. This will occur with an operational amplifier (which is a very desirable general purpose electronic component) until the required external frequency selective circuit elements have been added. The circuit for operation of the active datum and its operation will now be explained with reference to FIGS. 5A–5D.

The circuit for providing alternating electrical energy for sustaining oscillation of the active datum in the desired mode (and no other mode) and for operating an indicator signalling that the datum is active is provided in FIG. 5B. The circuit utilizes two integrated amplifiers (OA1, OA2), the first being configured as an operational amplifier with the gain being established by frequency dependent elements in the feedback path and in the load circuit to produce a datum drive which excites only the desired mode. The second integrated amplifier operates as a differential amplifier for providing a two state output for operating an LED indicator in either an on or off state as a function of the output state of the operational amplifier (OA1).

The energization circuit for the datum is as follows. The amplifier (OA1) is provided with dc energization by connection of one pin (8) to a filtered source of dc power of about 30 volts, another pin (4) being grounded. The regenerative input pin (3) is connected to the "tap" of a voltage divider (R1, R2) comprising a first resistor R1 connected to ground and a second resistor R2, in series with R1, connected to the filtered dc supply. The values of the resistors R1 and R2 are adjusted to set the dc level of the amplifier output to slightly below half the voltage of the dc supply, and to match the amplifier output impedance to the transducer load impedance for maximum energy transfer at resonance in the desired mode. The degenerative input pin (2) is connected via resistor R3 to ground and via feedback resistor R4 to the amplifier output pin. The amplifier output is coupled via inductor L1 to the input terminals of the driving (power input) transducer pair (57, 59). The terminals of the output transducer pair (58, 60) are connected to the degenerative input of the amplifier. As previously indicated, one terminal of each transducer, and the datum are grounded.

The circuit for indicating active operation of the datum includes the operational amplifier OA2 operating as a differential amplifier, and the voltage divider R5, R6, an LED, and a current limiting resistor R7 interconnectedd as follows. The amplifier OA2 is connected for energization to the filtered dc source in the same manner as OA1. The output of amplifier OA1 is coupled to the positive input pin (5) of the amplifier OA2. The voltage divider R5, R6 coupled between the filtered dc supply and ground couples a voltage exceeding the quiescent voltage at the output of amplifier OA1 to the negative input terminal of the amplifier OA2. Thus in the absence of oscillation of OA1, the amplifier OA2, operating as a differential amplifier, produces a "low" output. The "low" output is set insufficiently high to operate the LED when OA1 is quiescent and the LED remains off. Upon oscillation of OA1 however, the output of OA1 oscillates between a high state (approximately equal to the voltage of the filtered supply) and a low state (near ground). The output of OA1 oscillating at the 52.8 resonant frequency is coupled to the input of OA2. The amplifier OA2 is driven strongly at the resonant frequency of the datum, causing the LED to light.

The energy source, assuming the use of the component values indicated, and transducer design earlier described will operate the datum at only the desired 52.8 mode, and at no other. Single mode operation will now be explained with resort to FIGS. 5A, 5C, 5D, 5E, and 5F.

Figure 5C:
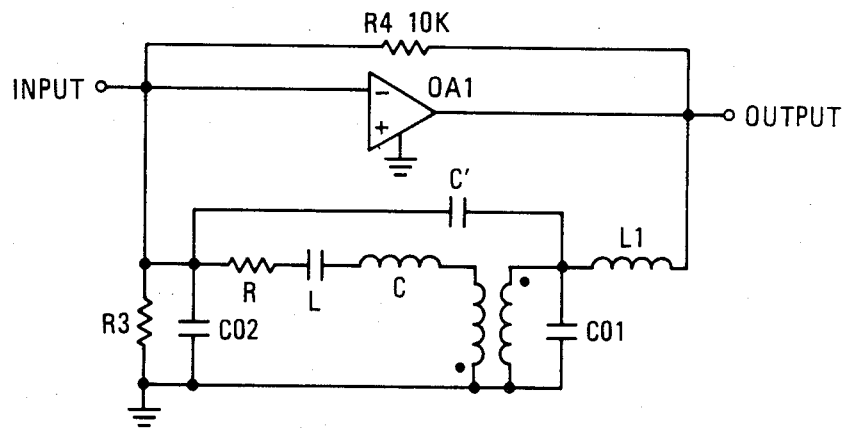

The circuit illustrated in FIG. 5C is a slightly simplified equivalent circuit in which only the amplifier OA1, the equivalent electrical and mechanical elements of the transducer, the gain controlling resistors R3 and R4, and the resonating inductance are shown. (The connections to the positive input terminal of the amplifier OA1 are not shown nor are the energizing connections shown.) The amplifier OA1 is accordingly shown as a three terminal (negative input, output and ground) electrical network having the feedback resistance R4 connected between its negative input terminal and the output terminal. A resistance R3 is connected between the negative input terminal of the amplifier and ground. Assuming that no additional impedances were present between the input terminal and the output terminal, the gain of the amplifier would be expressed as a ratio of (R3+R4)/R3. The piezoelectrically driven datum, which is reproduced in the same equivalent circuit illustrated in FIG. 5A, may also be regarded as a three terminal electrical network. The three terminals include an ungrounded input terminal, one terminal of C01; an ungrounded output terminal, one terminal of C02; and a ground connection. The ungrounded input terminal of the datum is connected via the inductor L1 to the output terminal of the integrated amplifier and the ungrounded output terminal of the datum is coupled to the negative input terminal of the amplifier. By inspection, it may be seen that the circuit illustrated in FIG. 5C is of some complexity and that it may be expected to have different properties at different portions of the frequency spectrum. For reasons that will now be explained, the power source only sustains oscillation at the desired mode and at no other.

The operation of the circuit may be regarded as involving the interaction of two circuits that are frequency dependent and the selection of an operational amplifier, of limited gain whose gain bandwidth limits are also used to produce a useful high frequency roll off. The first frequency dependent circuit is the feedback path in which the datum forms an equivalent "L" section filter over a portion of the frequency spectrum. The second frequency dependent circuit is the amplifier load circuit in which the inductor L1 and the equivalent input capacitance (C01) of the datum become series resonant at the frequency of the desired mode of the datum.

The low frequency equivalent circuit is illustrated in FIG. 5D. The calculated impedances are those corresponding to operation at 10 kHz. The equivalent circuit comprises a 10K feedback resistor (R4) connected between the ouput and the negative input of the operational amplifier, an inductor (L1) and a datum input capacitance (C01) in series between the amplifier output terminal and ground, and a shunt circuit comprising a 1.6K resistor (R3) shunted by the datum output capacitance C02. In addition, an impedance (Zd) corresponding to the series mechanical impedance of the datum is shown coupled between the output and the negative input of the operational amplifier.

The circuit performance implications at low frequencies (e.g. 10 kHz) flow from the circuit values. In the feedback circuit, the mechanical impedance of the datum (Zd) is very large providing an effectively open circuit, and leaving R4 having a resistance of 10K as the only equivalent element in the feedback path. The input impedance, since C01 approximates $-j$ 7,500 ohms, is also primarily set by R3 which is 1.6K ohms. From these values, the calculated amplifier gain is about 7. In the load circuit, at 10 kHz, the inductor L1 has an inductive reactance of $+j$ 300 ohms and the serially connected capacitor C02 has a capacitive reactance of $-j$ 7,500 ohms. The load circuit thus has an impedance which is higher than ideal by at least two orders of magnitude, permitting only a very small amount of energy to be supplied to the transducer.

In short, the lower modes up to about 35 kHz will be suppressed by a combination of low amplifier gain (due to high degenerative feedback) and high load impedance (due to the high capacitive reactance of the datum input capacitance) which produces a two to three order mismatch.

With regard to the observed transfer response of the datum, the peak at approximately 36 kHz, which is the worst spurious mode in the response, is not excited for the reasons which will follow. This peak is not a longitudinal mode but is a flexural mode, which in other cases may be substantially suppressed by better balancing of the transducer drive, etc. The longitudinal mode is characterized by a 180 degree phase reversal between the input transducers and the output transducers. The flexural mode, on the other hand excites phases which are not equal to 180, but rather closer to 90 degrees. Thus the amount of degenerative feedback is reduced by a substantial amount for this mode (several db). The level of this flexural mode is also down about 10 db. In addition, the frequency selective action of the tuned circuit, which is assumed to have a Q of 50, at 52.8 kHz, has an attenuation at 36 kHz of at least 10 db. Thus assuming about 25 db of attenuation relative to the resonant frequency, the amplifier gain of no more than 10 db (corresponding to a gain of 8) produces less than unity gain, and the mode will not be excited.

The same considerations apply to the mode at 46 kHz, where the peak is already down 25 db.

In the vicinity of resonance (52.8 kHz), the equivalent circuit is altered by reduction of the mechanical impedance (Zd) to a value of approximately 6,000 ohms and readjustment of the reactances of the inductance L1 to $+j$ 1,584 ohms and the datum capacitances C01 and C02 to values of $-j$ 1,580 ohms. As a consequence of the change in the impedance Zd, the primary control of the gain of the amplifier is set by Zd and XL1, which are both smaller than 10K. These values which shunt the 10K tend to reduce the value of the feedback impedance. However, the input impedance (R3, C02) also falls substantially since C02 has a lower value of $-j$ 1,580 ohms. A calculation shows that the gain of the circuit is about 8, slightly larger than at 10 kHz, but still limited.

The load circuit, at the desired mode of 52.8 kHz, is strongly affected by L1 and C01 which provide a series resonant load to the operational amplifier. Combined with an amplifier gain of about 6, excitation of the desired mode is assured. The load reactances result in a net load impedance of about 20 ohms. The result of resonance in the amplifier circuit is to increase the drive current to the sensor by approximately 10 db. The actual power coupled to the datum is in fact limited by the Q of the inductor and the internal resistance of the operational amplifier. Power dissipation of approximately 0.6 watts (maximum) is typical.

As the frequency continues to increase to 100 kHz for example, the equivalent circuit again goes through a transformation in which the mechanically equivalent impedance of the datum becomes so high as to be negligible in the equivalent circuit representation and the reactances of the capacitances now fall significantly.

In the gain calculation, assuming unlimited op-amp gain bandwidth, the gain will be determined by a feedback resistance which is solely R4 (i.e. 10 kHz), and the input impedance provided by R3 and C02 in parallel. C02 which is now −j 750 ohms, produces a net reduction in the input impedance, and an increase in gain. The calculated gain is from 9 to 12. In an operational amplifier having a gain bandwidth of a megahertz, the gain limit at 100 kHz will be approximately 10, and at 200 kHz approximately 5, etc., producing a very useful roll off.

In respect to the output load, the drop in capacitive reactance is matched by an increase in inductive reactance, again producing a resultant load impedance of approximately 2400 ohms and a mismatch of about one order of magnitude.

In practice the roll off of an operational amplifier has had a significant effect in suppressing the modes above 70 kHz which are the transverse modes while the gain calculation implies a gain no greater than 14 (23 db). The first strong peak near 73 kHz is down about 35 db. Combined with at least 10 db of attenuation attributable to the tuned circuit, the peak is at least 22 db short of providing unity gain as required to support the mode. At this point the roll off begins to contribute about 6 db per octave (approximately) of attenuation to which frequency peaks. In practice, the result is that transducers are not excited at the higher modes.

The source of excitation potentials for the datum, given the described increases, will not operate the datum at other than the desired mode. The datum resonances remote from the desired mode are suppressed as explained by a combination of limiting amplifier gain by the selection of the external impedances in the feedback path, by a tuned series resonant load circuit for the operational amplifier, and by use of an operational amplifier having limited gain bandwidth at frequencies above the frequency of the desired mode.

Figure 4C:
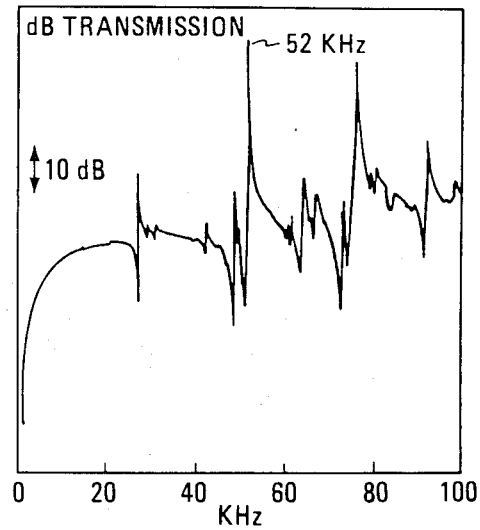

The datum, when a longer device is needed, may take the form illustrated in FIG. 4A. The FIG. 4A datum is generally similar to the datum illustrated in FIG. 3A in that it consists of an elongated member, a supporting plate, and piezoelectric transducers attached below the supporting plate. It differs in that the FIG. 4A operates at full wave resonance rather than at half wave resonance. The FIG. 4A datum is supported at a longitudinal antinode at one quarter of its length from one end. The desired resonant mode forming successive phases is illustrated in FIG. 4B, and the electrical response of the datum is illustrated in FIG. 4C. The FIG. 4C datum requires only modification of the circuit values of the electrical drive circuit of FIG. 5B. No other circuit changes are required.

The datums, when operated as described, exhibit greater accuracy than known competitive designs. The arrangement is susceptible of greater refinement should the application require. Such refinement may include the improvement of the reference surface accuracy by conventional techniques, and the plating of the reference surfaces. Nickel plating greatly hardens the reference surface, and directly increases the measurement accuracy. A suitable process, which also prevents corrosion, is the known "electroless" plating method.

In addition to providing greater surface accuracy and greater surface hardness, one may also further enhance the accuracy of the datum over the long term by attention to the selection and treatment of the datum material to maximize dimensional stability. Distortion may be reduced by optimum selection of the datum material and by annealing or other stress relief methods as the device is formed. Where costs permit, a homogeneous material such as quartz possesses optimum dimensional stability.

In use in the numerical machine control system, the datum may be subject to overshooting of the cutting surface in the calibration process. If the overshoot is small, the resilience of the datum post may be adequate to prevent permanent strains. However, with a typical overshoot arrangement, the datum may be supported in spring biased engagement with precision stops. Thus, assuming that the cutter overshoots, the datum will be free to deflect away from the cutter, avoiding permanent gross deformation or significant surface abrasion. Where one reference surface and only one reference surface is used, freedom of the datum to translate along that coordinate or to rotate about one axis is required. Where two reference surfaces are used for two coordinates, freedom of the datum to translate along two coordinate areas or rotate about two axes is required.

What is claimed is:

1. In an apparatus for precisely locating the cutting surface of a positionable cutter in relation to the coordinate reference system of a machine tool, the combination comprising A. an active datum having a vibratory planar reference surface at a known position in relation to said coordinate reference system, said vibration occurring at ultrasonic frequencies with displacements that are small in relation to the desired positional accuracy, said datum comprising (1) an elongated first member, a lateral surface portion thereof providing said vibratory planar reference surface, said member being extensionally vibratory in a desired mode established along the longitudinal axis thereof with an antinodal region at either end and at least one nodal region at an intermediate position along said longitudinal axis, Poisson coupling causing a significant vibratory surface motion orthogonal to said longitudinal axis, one or both of said motions being present throughout said lateral surface portion (2) a support for attaching said first member at the nodal region of said desired mode to favor said mode with minimum energy transmission of said extensional component via said support to said machine tool, said support being sufficiently compliant to surface motion orthogonal to said longitudinal axis to permit vibrations in said desired mode and relatively rigid with respect to flexural motion to maintain accuracy of said lateral surface portion in relation to said support and to suppress flexural vibrations, said support being attached to said machine tool so that said vibratory planar reference surface is at a stable position in relation to said coordinate reference system, and (3) electromechanical transducer means applied to said elongated member for exciting vibration in said desired mode and B. an acoustic accelerometer sensor acoustically coupled to said cutter for producing an electrical output signal in response to said vibrations when said cutter contacts said planar reference surface to indicate contact and thereby the cutter position in said coordinate reference system, said acoustic sensor being substantially uncoupled acoustically from said datum in the absence of such contact.

2. The combination set forth in claim 1, having in addition thereto
(1) a source of alternating electrical energy at the resonant frequency of said datum in said desired mode to sustain oscillations in said desired mode.

3. The combination set forth in claim 2 wherein said source of alternating electrical waves comprises;
(A) an oscillator including;
  (1) a gain element having an output and an input; and
  (2) electrical frequency selective means coupled to said gain element for increased gain at the frequency corresponding to said desired mode and decreased gain at the frequencies corresponding to said undesired modes, and wherein
(B) said electromechanical transducer means comprises at least two electromechanical transducers, at least one being electrically coupled to the output of said gain element, and at least one other being electrically coupled to the input of said gain element, said at least one electromechanical transducer being mechanically coupled to said elongated member for generation of mechanical motion in said desired mode and said at least one other electromechanical transducer being mechanically coupled to said elongated member for response to the motion resulting from said desired mode, said transducers thereby being mechanically coupled to effect regenerative electrical feedback between the output and input of said gain element;
said oscillator-transducer means combination having adequate gain to sustain oscillation in said desired mode and inadequate gain to sustain oscillation in said undesired modes.

4. The combination set forth in claim 3 wherein said electrical frequency selective means are of lower electrical Q and correspondingly broader bandwidth than the mechanical Q and corresponding bandwidth of said elongated member whereby the amplitude of vibrations in the desired mode will be maintained at a substantially constant value irrespective of small changes in the frequency of said desired mode.

5. The combination set forth in claim 4 wherein the elongation of said elongated member is in a ratio of length to cross-sectional dimension of at least five to one with said cross-sectional dimension being less than 1/10th wavelength to avoid coupled modes and reduce the sensitivity of the frequency of the desired mode to said cross-sectional dimension.

6. The combination set forth in claim 5 wherein said elongated member is a parallelepiped of square cross-section and wherein
said electromechanical transducer means further comprises four electromechanical transducers, a first pair electrically coupled to the output of said gain element, and a second pair electrically coupled to the input of said gain element, said first pair being mechanically coupled on one opposing pair of lateral surfaces, and said second pair being mechanically coupled on the remaining opposing pair of lateral surfaces to provide symmetric drive and symmetric loading to minimize the tendency to flexural vibration.

7. The combination set forth in claim 2 wherein
(A) said source of alternating electrical waves comprises an operational amplifier having
  (1) an input and an output, and ground;
  (2) external impedances for establishing amplifier gain connected in a feedback path between said output and said input, and between said input and ground; and
  (3) an inductor connected to said output
(B) said electromechanical transducer means comprises at least two piezoelectric transducers, at least one being electrically coupled via said inductor to said amplifier output, and at least one other being electrically coupled to amplifier input, said at least one piezoelectric transducer being mechanically coupled to said elongated member for generation of the mechanical motion in said desired mode and said at least one other piezoelectric transducer being mechanically coupled to said elongated member for response to motion in said desired mode, said transducers thereby being mechanically coupled to effect regenerative electrical feedback between said output and input,
said inductor being series resonant with the capacitive reactance of said at least one piezoelectric transducer to increase the driving current at said resonant frequency, and thereby favor operation in said desired modes.

8. The arrangement set forth in claim 7 wherein the gain of the operational amplifier, and the selectivity of the resonant electrical circuit, are selected to prevent resonant operation at undesired lower frequency modes, said operational amplifier having a limited gain bandwidth selected to prevent resonant operation at undesired higher frequency modes.

9. The combination set forth in claim 8 wherein the elongation of said elongated member is in a ratio of length to cross-sectional dimension of at least five to one with said cross-sectional dimension being less than 1/10th the wavelength to avoid coupled modes and reduce the sensitivity of the frequency of the desired mode to said cross-sectional dimension.

10. The combination set forth in claim 9 wherein said elongated member is a parallelepiped of square cross-section and wherein
said electromechanical transducer means further comprises four piezoelectric transducers, a first pair being electrically coupled to the output of said gain element, and a second pair being electrically coupled to the input of said gain element, said first pair being mechanically coupled on one opposing pair of lateral surfaces, and said second pair being mechanically coupled on the remaining opposing pair of lateral surfaces to provide symmetric drive and symmetric loading to minimize the tendency to flexural vibrations.

11. The arrangement set forth in claim 10 wherein the longitudinal axis of said elongated member is one half wavelength in length and said support is substantially at the mid-point along said axis.

12. The combination set forth in claim 11 wherein the longitudinal axis of said elongated member is one full wavelength in length and said support is substantially one quarter wavelength from one end.

13. The arrangement set forth in claim 2 wherein the lateral surfaces of said first member are plated with nickel to harden the surfaces thereof and minimize corrosion.

14. The arrangement set forth in claim 10 wherein a second operational amplifier is provided coupled to the output of said first operational amplifier, having a regenerative input coupled to the output of said operational amplifier and a degenerative input coupled to a bias voltage set to prevent output in the absence of oscillations but to permit output when oscillators occur and an electrical indicator coupled to the output of said second operational amplifier to indicate response to oscillations.

* * * * *